Aug. 2, 1932.  J. A. V. TURCK  1,869,872
CALCULATING MACHINE
Filed July 31, 1923   10 Sheets-Sheet 1

Inventor.—
Joseph A. V. Turck
By

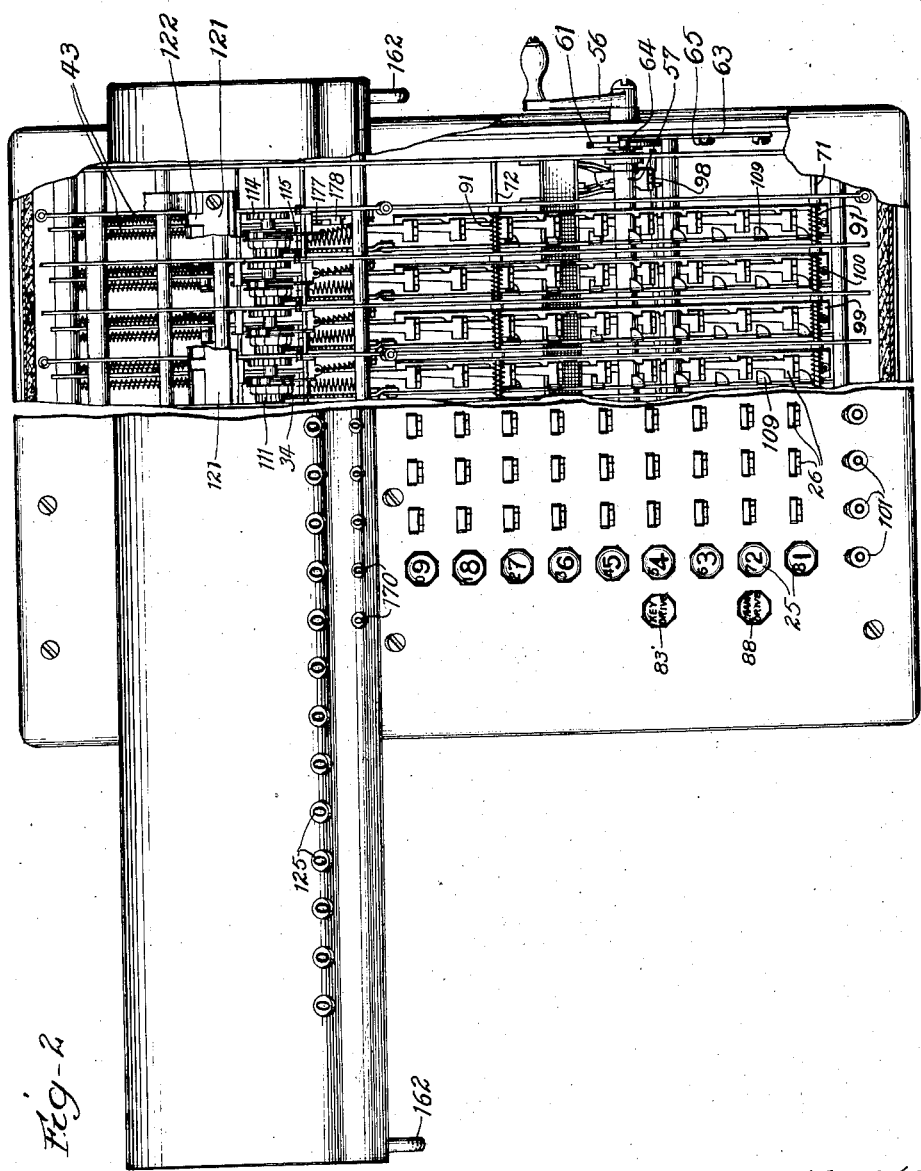

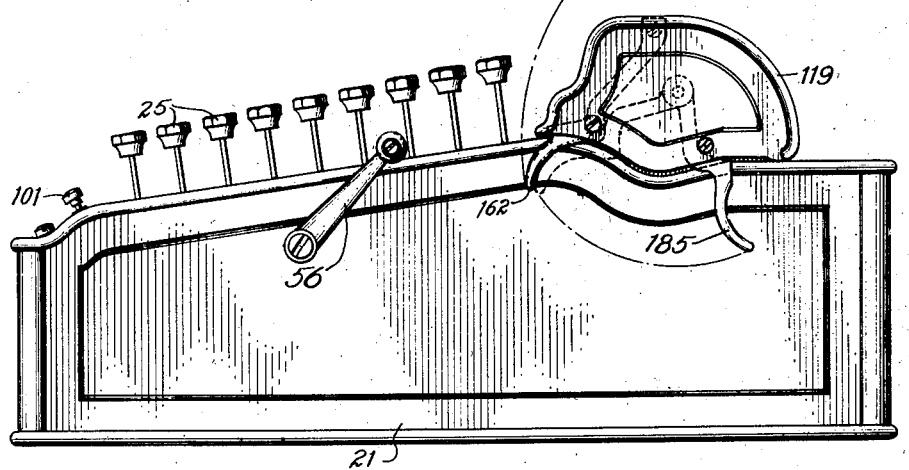
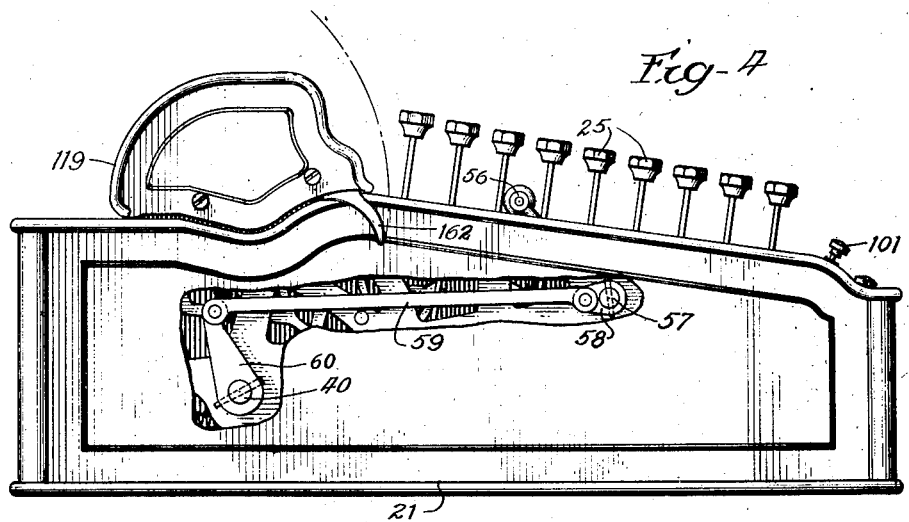

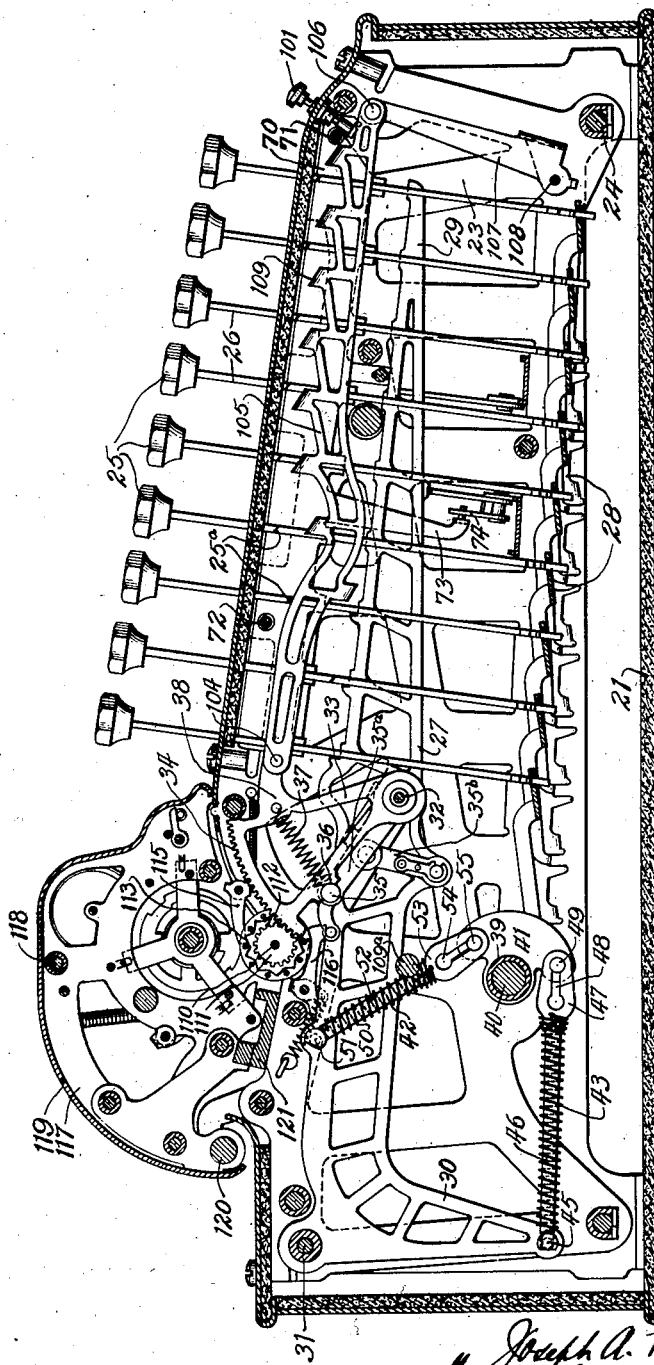

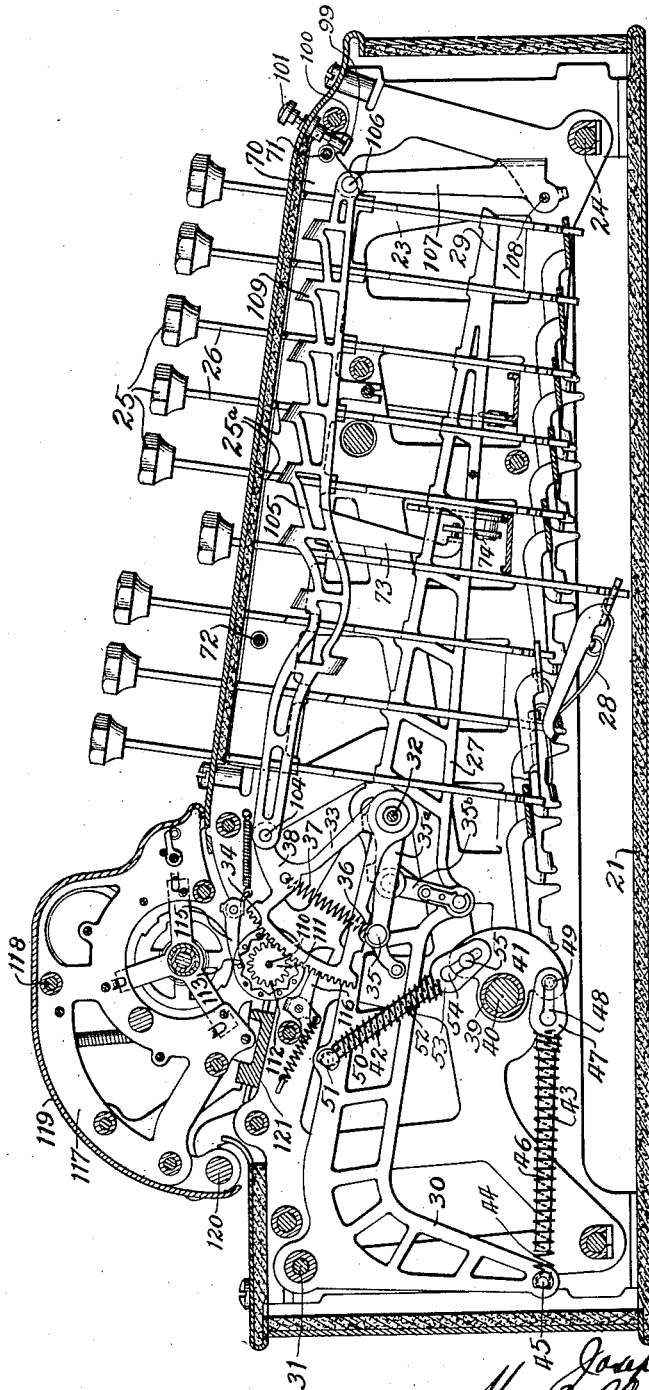

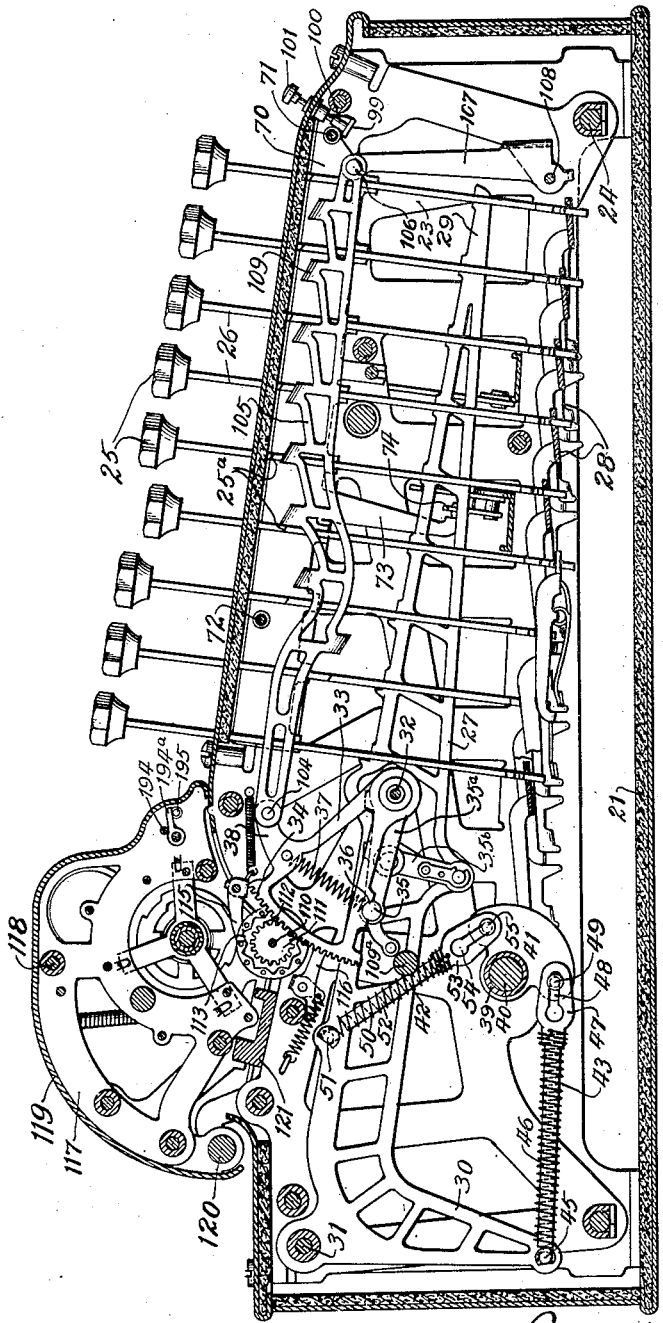

Aug. 2, 1932.  J. A. V. TURCK  1,869,872
CALCULATING MACHINE
Filed July 31, 1923  10 Sheets-Sheet 7
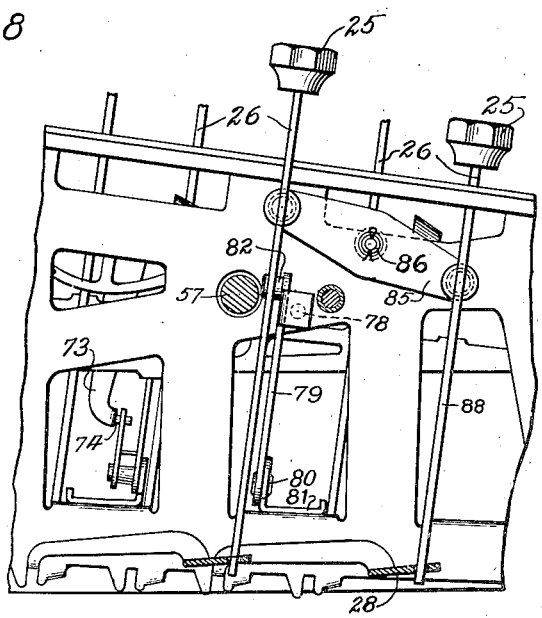
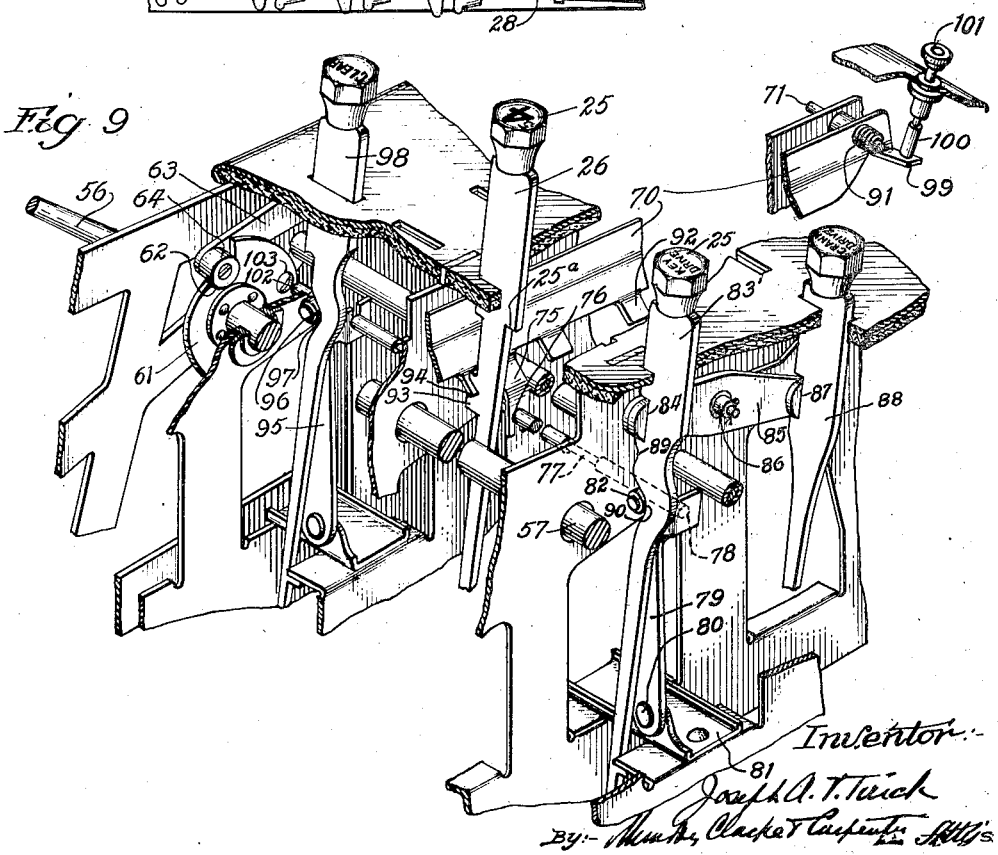

Aug. 2, 1932. J. A. V. TURCK 1,869,872
CALCULATING MACHINE
Filed July 31, 1923  10 Sheets-Sheet 8
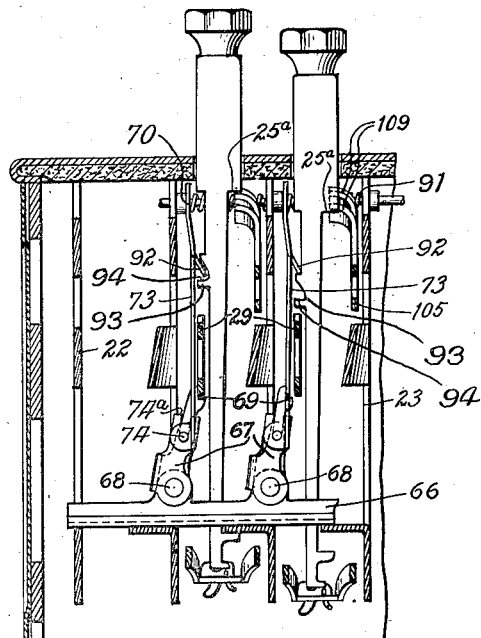

Aug. 2, 1932.                J. A. V. TURCK                1,869,872
                          CALCULATING MACHINE
                      Filed July 31, 1923    10 Sheets-Sheet 9
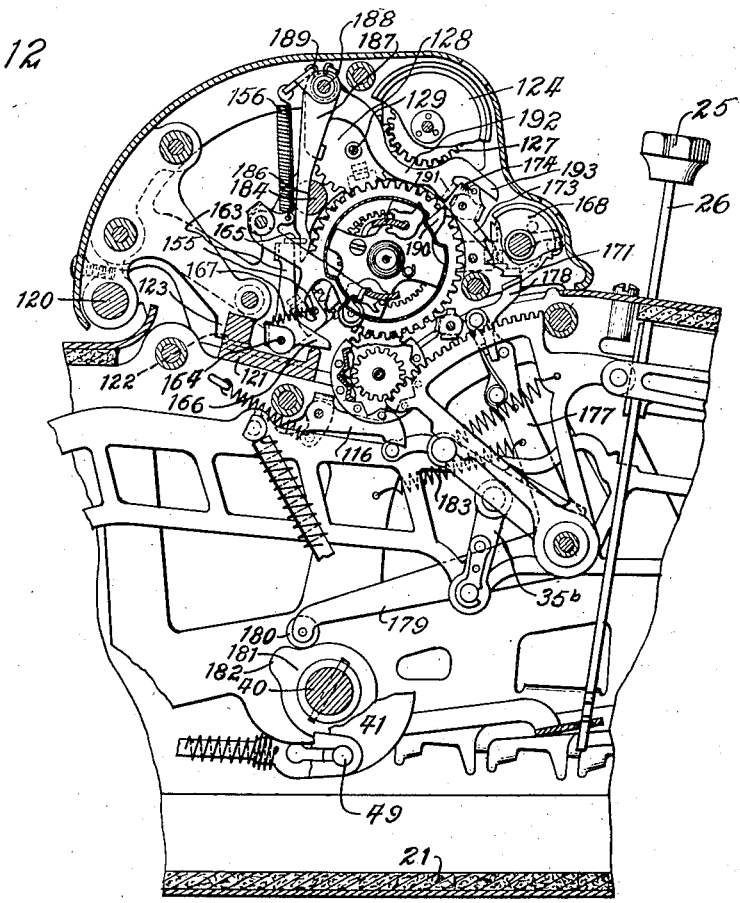

Aug. 2, 1932.                J. A. V. TURCK                 1,869,872
                          CALCULATING MACHINE
                         Filed July 31, 1923         10 Sheets-Sheet 10

Patented Aug. 2, 1932

1,869,872

UNITED STATES PATENT OFFICE

JOSEPH A. V. TURCK, OF WILMETTE, ILLINOIS, ASSIGNOR TO FELT & TARRANT MANUFACTURING COMPANY, OF CHICAGO, ILLINOIS, A CORPORATION OF ILLINOIS

CALCULATING MACHINE

Application filed July 31, 1923. Serial No. 654,874.

The essential object of this invention is to provide a calculating machine that is alternatively operable by key-drive or by key-set power-drive, and including an accumulator mechanism alternatively stationary for key-driven actuation or either stationary or shiftable for key-set power-driven actuation. With the machine of the present invention, the operator has the choice of either a key-drive or a key-set power-drive when performing additive calculation, whether positively as in addition, or negatively by the complemental method as in subtraction. In performing multiple stroke calculation, whether positively as in multiplication or negatively as in division, the operator may employ the key-drive with or without shift of the accumulator mechanism, or the power-drive with shift of the accumulator mechanism for the accumulation of each order of the multiple stroke factor.

Briefly stated, the machine of the present invention includes in its construction the following features or any one or combination of them, as pointed out in the appended claims: ordinal column actuating mechanism alternatively operable by ordinal key-drive or by key-set power, in the present instance crank, drive; a manually-controlled device for determining the character of drive of the column actuators; a power mechanism for driving the column actuators in key-set power-driven actuation; ordinal keys for driving the column actuators in key-driven actuation or for setting said actuators for power-driven actuation; a carriage alternatively stationary for key-driven actuation or key-set power-driven additive actuation, or shiftable for key-set power-driven multiple-stroke actuation, said carriage supporting and shifting with it an ordinal accumulator mechanism, including means for effecting carrying of the tens, arranged to receive actuation from the column actuators in any ordinal position of the carriage, and also supporting a shiftable counter for registering the power actuation in each ordinal position of the carriage; and zeroizing mechanism for restoring to zero the various orders of the accumulator mechanism and of the counter.

The invention further provides the following important novel features: a cushioning key-stroke to relieve any abrupt jar which occurs from the sudden stopping of the mechanism at the end of the key stroke; the provision of a dual flexible link action through which power is applied for additive operation in either key or power-drive; a new direct and indirect, or combined direct and indirect actuation of the numeral wheels of the registering mechanism; a digital control common to both key and power drive; an ordinal locking mechanism for the power drive controlled selectively by a universal or by a columnar release.

In addition to the general objects recited above the invention has for further objects such other improvements or advantages in construction and operation as may be found to obtain in the structures and devices hereinafter described or claimed.

In the accompanying drawings, forming a part of this specification and showing, for purposes of exemplification, a preferred form and manner in which the invention may be embodied and practiced, but without limiting the claimed invention specifically to such illustrative instance or instances:—

Fig. 2 is a view similar to Fig. 1 but with a part of the top casing plate and of the carriage and some of the keys broken away to show the interior construction;

Fig. 3 is a right hand side elevation of the machine;

Fig. 4 is a left hand side elevation of the machine showing a part of the side casing plate broken away to illustrate part of the power drive;

Fig. 5 is a vertical section taken longitudinally of the machine and showing the parts of the actuating mechanism in normal position;

Fig. 6 is a sectional view similar to Fig. 5, but showing the operation of the actuating mechanism in key-driven actuation of the machine;

Fig. 7 is another view similar to Fig. 5, but showing the operation of the actuating mechanism in key-set power-driven actuation of the machine.

Figs. 8, 9 and 10 are respectively fragmentary longitudinal sectional, perspective, and transverse sectional views showing the column actuator locking mechanism and the control keys whereby the locking mechanism may be variously released or set, as hereinafter described. In Fig. 10, the view is towards the front of the machine;

Fig. 11 is a composite sectional view taken transversely of the machine and showing the accumulator mechanism, the counter mechanism and various other parts;

Fig. 12 is an enlarged longitudinal sectional view through the rear part of the machine;

Fig. 13 is a perspective view of the automatic carrying and transmitting mechanism for transmitting both direct and indirect actuation, the parts being shown in both assembled and disassembled relation;

Figure 1:
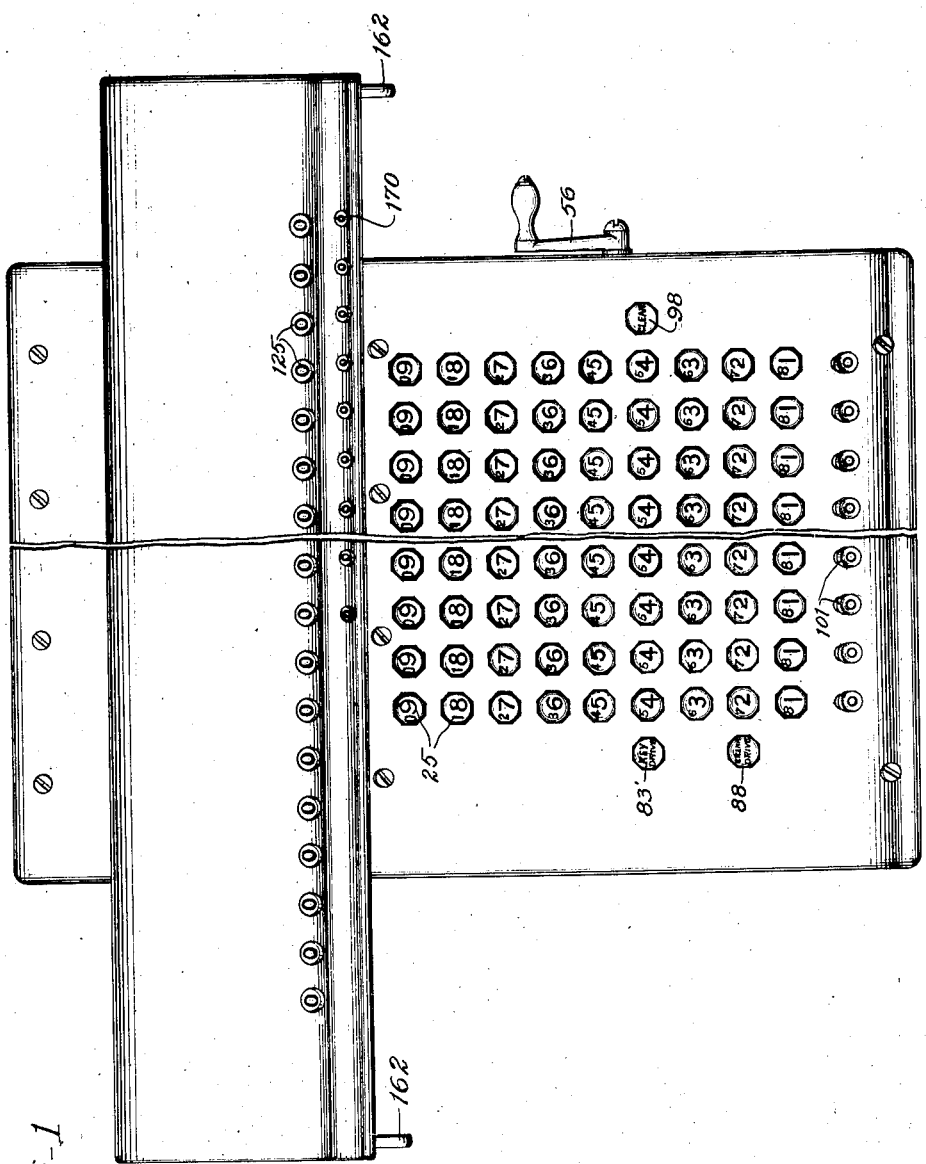
Figure 1 is a top plan view of a calculating machine constructed in accordance with the invention.
Figure 14:
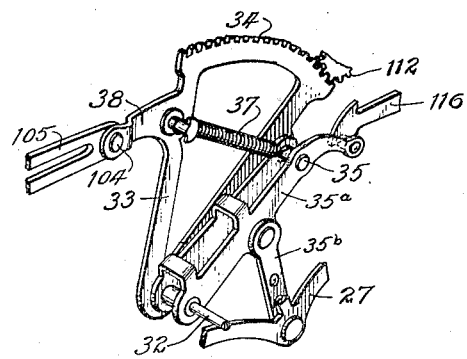
Fig. 14 is a detailed perspective view of the actuating sector and connections between said sector and the column actuator.
Figure 15:
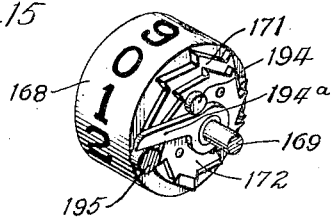
Fig. 15 is a detailed perspective view of the counter mechanism.
Figure 16:
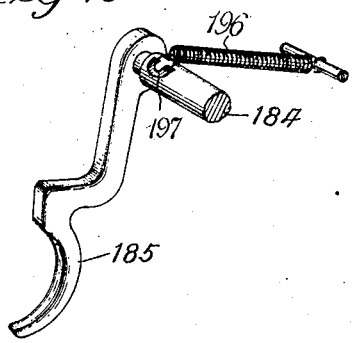
Fig. 16 is a detailed view of the spring return for the zeroizing handle.

The various instrumentalities, which constitute the actuating mechanism from which calculative motion is transmitted to the accumulator mechanism, are supported by a frame mounted on the base 21 of an enclosing casing, said frame consisting essentially of side skeleton plates 22 and intermediate skeleton plates 23 disposed between the various actuating mechanisms of the several orders of the machine, and all tied together at suitable points by transverse tie rods 24. The various orders of the actuating mechanism are "stationary", i. e., there is no shift from order to order of the actuating mechanism. In performing multiple-stroke key-set power-driven calculation, shifting is effected by the carriage which supports the accumulator mechanism, as hereinafter described.

According to the present type of machine, a number of columns of nine keys each are provided, a column for each order of the machine. Each column of keys 25 corresponds with the column actuator and attendant parts and constitutes a mechanism either for driving the column actuator an amount proportionate to the digital value of the particular key operated or for setting and controlling the column actuator to be otherwise driven a like amount. The keys of each column are numbered from "1" to "9" and complementally for negative calculation from "0" to "8" in front to rear order of the machine; the key at the extreme front is adapted to effect or otherwise to control operation of the column actuator through an arc substantially one-ninth of that produced by the operation of the key at the extreme rear of the machine, and upon depression of intermediately positioned keys, the column actuator is or may be moved through various arcs respectively determined by the digital value of the intermediate keys depressed.

Each key 25 is provided with a stem 26 extending down and bearing upon the corresponding column actuator 27 for the key-driven actuation of the machine. Spring mechanisms 28 similar to those employed in the well known Comptometer are utilized for the purpose of restoring the respective keys 25 to normal independently of the column actuator. The Comptometer is exemplified in any one of the following prior Letters Patent of the United States: Dorr E. Felt, No. 762,520 and No. 762,521, dated June 29, 1904; Dorr E. Felt, No. 1,028,344, dated June 4, 1912; Dorr E. Felt, No. 1,066,096, dated July 1, 1913; Dorr E. Felt, No. 1,072,933, dated September 9, 1913; Kurt F. Ziehm, No. 1,110,734, dated September 15, 1914; Joseph A. V. Turck, No. 1,357,747 and No. 1,357,748, dated November 2, 1920.

There is a column actuator 27 for each column of nine keys of the machine, and each column actuator is preferably constructed in the form of a bell-crank lever having a long horizontal arm 29, a relatively short depending vertical arm 30, and being pivoted at the junction point of said arms to the framework at the rear of the machine, as shown at 31. The horizontal arm 29 of the column actuator extends forwardly from rear to front of the machine and receives the key-impulse to actuate the accumulator, when the machine is set for key-driven actuation. Pivoted at 32 on a fixed shaft extending through and supported by the framework of the machine is an actuator sector 33 for transmitting the calculative motion of the column actuator to the accumulator. The pivoted sector 33 is provided with a set of gear teeth 34 on its arcuate periphery and said teeth are adapted to mesh with ordinal gears forming part of the ratchet mechanisms. Motion produced by the normal movement of the column actuator is transmitted to the pivoted sector 33 by an abutment 35 at the end of a double-arm lever 35a pivoted on the hub of the sector 33 concentrically with shaft 32 and connected with the column actuator by a link 35b. The abutment 35 is normally held in engagement with the rear radial edge 36 of the sector by a spring 37 connecting the forward radial arm 38 of said sector with said abutment 35. So long as any key 25 is depressed only that amount necessary to effect a movement of the sector 33 corresponding with the digital value of the key, the spring 37, during the downward movement of the column actuator arm 29, will hold the sector 33 against the abutment 35. If, however, the key be depressed beyond such normal movement the sector 33 will be arrested, and will be prevented from moving more than the amount of the digital value of the particular key depressed, by the engagement of the respective digital stop 109, of the stop bar 105 that is connected with said sector, with the particular key depressed, but the spring 37 will permit the abutment 35 to move, with a yielding action, away from the sector 33 as the column actuator arm 29 continues to move downwardly. This construction provides a flexible or cushioning action for the termination of the down stroke of any key 25, during key-driven actuation, without in any manner effecting the definite motion required for correct calculative actuation of the accumulator. However, the tension of the spring may be sufficient to prevent any extended independent movement of the abutment 35 away from the sector, but without effecting the cushioning action. The cushioning action relieves any abrupt jar that may occur from the sudden stopping of the mechanism at the end of the key stroke.

In key-driven actuation, the column actuators are restored to normal position, i. e., the horizontal arms 29 of said actuators are lifted, respectively by the key-driven functioning member of the corresponding dual flexible link mechanism. This mechanism is a very important feature of the invention. It provides power for restoring the column actuators to normal in key-driven actuation, relieves the column actuators from the load of creating such power in key-set power-driven actuation, and yet provides, during power-driven actuation, a yielding connection between the column actuator and the universal actuator, permitting a constant movement of the universal actuator in all orders to take place coincidently with a variable movement of the column actuators, or no movement at all of said column actuators, as determined by the key-setting. It also forms a flexible connection for both depressing and restoring the column actuators to normal in power-driven actuation. Further important features of the dual flexible link mechanism will be developed in the description of the key-set power-driven operation of the machine.

The universal actuator 39 functions as an abutment for causing the spring-tensioning that effects the return movement of the column actuators in key-driven actuation. It comprises a power-driven oscillatory shaft 40 extending transversely of the main frame. Fixed to said shaft 40 so as to partake of its oscillatory movement are the universal actuator plate members 41 which correspond ordinally with the column actuators 27. It is particularly these plate members 41 which constitute the abutments for the spring tensioning hereinafter referred to.

The dual flexible link mechanism of each column actuator and corresponding universal actuator plate comprises an upper link mechanism 42 and a lower link mechanism 43. The lower flexible link mechanisms 43 are arranged in pairs, as shown in Fig. 2, but one may be employed for each column actuator; said mechanism provides the spring-tensioning which affords the power for the return of the column actuator in key-driven actuation; during such actuation, any tension in the upper link mechanism is relieved by the tensioning of said lower mechanism, so that the upper mechanism remains perfectly neutral in key-driven actuation and affords no resistance to the column actuator movement. The parts which provide the flexible link action are shown in their normal positions in Fig. 5 and in Fig. 6 in the positions they assume, during key-driven actuation, at the end of the down stroke of a key. The said lower flexible link mechanism 43 includes a horizontally disposed coil spring 44 connected at its rear end to the stud 45 at the lower end of the vertical arm 30 of the column actuator. Within the spring 44 is a ram 46 having a head 47 which projects beyond the forward end of the spring 44. The forward end of the spring is secured to the head 47. In length, the ram 46 is so proportioned relatively to the spring 44 that, when the rear end of the ram touches the abutment 45, the column actuator is relieved from spring tension. As shown, the head 47 is provided with a slot 48 extending parallel with the ram body 46 and the forward end of the ram is slidably attached to the lower end of the corresponding universal actuator plate 41 by a stud 49 secured to said plate, which projects transversely through said slot 48. The upper flexible link mechanism 42 of each order is constituted of parts similar to those of the lower mechanism 43, but is somewhat less in length. The spring 50 is secured at its upper end, at 51, to a stud located near the rear end of the horizontal column actuator arm 29, and said spring 50 inclines forwardly and downwardly toward the upper part of the universal actuator plate 41, being secured to the head 53 of the ram 52. The ram 52 has a slidable connection with the plate 41 by the stud 55 which projects through the slot 54 in the ram head.

It will be noted that the upper and lower flexible link mechanisms 42 and 43 are respectively located on opposite sides of the pivotal axes 31 and 40 of the column actuator and of the universal actuator, and both said link mechanisms have slidable connections, as hereinbefore described, with the universal actuator. These features, taken in conjunction with the construction and arrangement of the parts themselves, cause the following operation to take place during key-driven actuation of the machine. In such actuation, the universal actuator including all the ordinal plates 41 is stationary, being in fact locked against movement by a device hereinafter described. When the parts are at normal, the studs 49 and 55 are respectively located at the forward and lower ends of the slots in the ram heads 47 and 53 as shown in Fig. 5. On depression of the numeral key 25, the horizontal column actuator arm 29 moves downwardly an amount proportional with the digital value of the key depressed. This movement of the column actuator turns the transmitting gear sector 33 in a counter-clockwise direction (see Fig. 6) the required amount for the incremental accumulative actuation, which occurs on the reverse clockwise rotation of the sector 33. The downward movement of the horizontal column actuator arm 29 causes a rearward movement of the depending column actuator arm 30 and this rearward movement of said arm 30 stretches or tensions the spring 44 to produce power for the return movement of the column actuator, inasmuch as the ram 46 remains stationary. In this manner, the spring 44 of the flexible link mechanism functions as the return spring for the column actuator in key-driven actuation. Although the spring action of the upper flexible link mechanism 42 is opposed to that of the lower flexible link mechanism 43, the spring 50 of said upper mechanism is not tensioned in either the downward or return movement of the column actuator and thus interposes no resistance to the movements of the parts in key-driven actuation. The entire upper flexible link mechanism 42 moves bodily downwardly with the horizontal arm 29 of the column actuator, as shown in Fig. 6, the ram head 53 with its slot 54 sliding relatively to the stud 55 on the stationary universal actuator plate.

In all forms of calculative actuation, it is the upward return movement of the transmitting gear or adding sectors 33 that effects the actual transfer of incremental ordinal accumulation to the accumulator mechanism, namely, the adding actuation. This is effected by an ordinal internal ratchet mechanism, operating in like manner to that shown and described in the Comptometer patents hereinbefore mentioned.

The operation of the actuating mechanism of the machine, when performing key-set power-driven, in the present instance crank-driven, calculation is illustrated in Fig. 7. In such key-set power-driven actuation, the depression of any ordinal numeral key merely releases or unlocks the column actuator corresponding to its order for subsequent calculative movement by the power mechanism, the operation of a numeral key being a mere unlocking of an ordinal locking device corresponding to the order in which the key is depressed, as contra-distinguished from an actual calculative movement produced by key operation in key-driven actuation of the machine. When the machine is set to operate in key-set power-driven actuation, the column actuators in all orders of the machine are locked against movement by an ordinal locking mechanism and only those column actuators are operated which have been released by a setting of one of the corresponding ordinal keys. The oscillatory movement of the universal actuator plates 41 is employed first to depress and then elevate those column actuators which have been released from the ordinal locking mechanism by previous numeral key setting.

In the present embodiment of the invention, such oscillatory movement of the universal actuator is effected by a crank mechanism, see Figs. 2, 3, 4, and also Figs. 7 and 9. The crank 56 is mounted on the outside of the right-hand vertical casing plate at the end of a power shaft 57 which it rotates. The power shaft 57 extends transversely through the supporting frame of the machine and is provided at its left-hand end, see Fig. 4, with a crank 58 on which is pivoted eccentrically to the axis of shaft 57 the forward end of a pitman 59. The pitman 59 extends rearwardly of the machine and is pivoted at its rear end to an oscillatory arm 60 secured to the left-hand end of the universal actuator shaft 40. The connections in the above described train are so proportioned relatively to each other that each single rotation of the crank 56, in either direction, will impart first a clockwise and next a counter-clockwise movement to the universal actuator shaft 40 and the series of ordinal actuator plates 41. In other words, each single rotation of the crank 56 is accompanied by a downward and upward oscillation of the universal actuator plates. In key-set actuation, each single oscillation of said plates 41 effects a single incremental accumulative movement of the selected column actuators. Provision is made for partly arresting or retarding the motion of the crank 56 at the termination of each single rotation, in order to inform the operator that an incremental accumulative actuation has been effected. Near its right-hand end, see especially Figs. 2 and 9, the power shaft 57 is provided with a disk 61 in the periphery of which is cut a recess or notch 62. Pivoted to the side skeleton plate of the framework is an arm 63 provided at its rear end with a roller 64 which enters the notch 62 in the disk just at the end of a single rotation of the crank 56. A spring 65 (see Fig. 2) pulls the arm 63 downwardly so that the roller 64 engages the periphery of the disk 61 and will enter the notch at the proper time. This construction also serves to retain the crank 56 in normal position, and, without actually preventing movement of the crank, informs the operator, by interposing a temporarily increased resistance to crank movement, of the termination of a single actuation of the universal actuator.

The ordinal locking mechanism for preventing actuation of the column actuators by the universal actuator, in power-driven operation, is shown more particularly in Figs. 8, 9 and 10. Extending transversely of and supported by the framework is a bar 66 which constitutes the support for the ordinal locks 67. These locks 67 are respectively pivotally mounted at 68 on said bar 66 and their upper free ends are provided with locking notches 69 which are projected beneath the horizontal arms 29 of the column actuators to prevent depression thereof, whenever the locks 67 have been shifted pivotally toward the left of the machine, (towards the right as seen in Fig. 10) by setting the machine for power-driven operation. Each ordinal lock 67 is controlled individually by its corresponding ordinal lock control bar 70. These bars 70 extend from front to rear in the various orders of the machine and are loosely supported by front and rear rods 71 and 72, which permit the bars to be swung individually or in unison on axes parallel with their length. Each bar 70 is provided with a depending arm 73 the lower end of which has a pin 74, which works in a slot 74a in the corresponding ordinal column actuator lock. When the lower edges of the respective bars 70 are swung in unison toward the right, in a counter-clockwise direction by the mechanism for setting the machine for power-driven operation, the several locks 67, through the connections 73, will be swung toward the right in a clockwise direction (as viewed in Fig. 10) to move the locking notches 69 into engagement with the column actuator arms 29. For this purpose each control bar 70 is provided with a depending arm 75 (see Fig. 9) provided with a slot 76 that receives the grooved portion 77 of a shift rod 78 extending transversely of the framework. The shift rod 78 is engaged at its left-hand end by the upper end of a rocker arm 79. The lower end of said rocker arm is pivoted at 80 on a transverse supporting bar 81. Projecting rearwardly from the upper end of the rocker arm 79 is a roller 82 which forms the abutment for shifting the rocker arm 79 either toward the right or toward the left of the machine, in response to operation of the control key 83. The control key 83 is designated "key drive" and is provided below the top casing plate with a notch 84 that loosely receives the rear end of a walking beam 85. The center of the walking beam 85 is pivoted at 86 to the side skeleton plate of the framework and the front end of said beam is loosely mounted within a similar notch 87 in the "crank drive" control key 88. The notches 84 and 87 are so located in the respective control keys 83 and 88 that the walking beam 85 will elevate one key as the other is depressed. The "key-drive" control key 83 is provided with an upper notch 89 and a lower notch 90 so located that when the "crank drive" control key 88 is depressed the notch 90 is in engagement with the roller 82 on the upper end of the rocker arm 79, and when the "key drive" control key 83 is depressed the upper notch 89 is in engagement with the roller 82. As shown in Fig. 9, the upper notch 89 is located farther toward the right of the machine than the lower notch 90. When the crank drive control key is depressed and the key drive control key is concurrently elevated, the positioning of the notch 90 in registry with the roller 82 permits the several control bars to move toward the left of the machine (or toward the right as viewed in Fig. 10) to shift the several ordinal locks 67 into locking positions. This movement of the control bars 70 is accomplished by springs 91 encircling the supporting rods 71 and 72 in the various orders of the machine between each control bar and the corresponding ordinal skeleton plate and bearing on the control bars in such manner as to push their depending arms 73 toward the left of the machine, i. e. toward the right-hand side of Fig. 10, to effect the movement of the several ordinal locks 67 into column actuator locking positions. On the other hand when the "key drive" key 83 is depressed the upper notch 89 is brought into registry with the roller 82, and such movement of the key 83 causes the rocker arm 79 to move toward the right of the machine, with the result that the rod 78 is likewise moved toward the right. This movement of the rod 78 is transmitted to the several control bars 70 in unison through the arms 75, thereby shifting the connecting arms 73 in unison toward the right of the machine (i. e., toward the left-hand of Fig. 10) to shift all the ordinal locks 67 into inoperative positions. The last described operation effected by depression of the key 83 sets the machine for key-driven actuation, whereas the depression of the key 88 sets the machine for power-driven actuation.

As hereinbefore stated, when the machine is set for power-driven actuation, the depression of an ordinal numeral key 25 unlocks the ordinal lock 67 of the corresponding order. For this purpose each control bar 70 is provided with a series constituted of nine depending projections 92 which respectively correspond to the column of nine numeral keys 25 of the corresponding order of the machine. Each numeral key 25 is provided with a projection 93 located on the right-hand side of its stem 26 and having a notch 94 which receives the corresponding projection 92 of the ordinal lock control bar when the key is in normal elevated position. On depression of the key for key-set actuation the shoulder above the notch 94 engages the control bar projection 92, so that the downward movement of the key causes the lower edge of the control bar to move toward the right of the machine, with the result that the depending connection 73 is also shifted toward the right of the machine (toward the left as viewed in Fig. 10) to throw the ordinal lock 67 of the order corresponding with the key to inoperative position, thereby permitting the universal actuator to effect a calculative movement of the column actuator corresponding with that order. As the key 25 moves downwardly the shoulder above the notch 94 is positioned beneath the projection 92, as shown in Fig. 10, thereby holding the key depressed in key-set position until released either by the universal release mechanism, or as hereinafter described. After the keys of the various selected orders have been "set" as above described, the universal actuator mechanism may be operated either for a single actuation, as in additive calculation, or for as many repeated actuations as desired, when performing multiple stroke calculation.

When the desired calculative actuation has been completed, whether additive or multiple stroke, the several selected numeral keys 25 which have been set are restored to normal positions and the released column actuator locks of their respective orders are repositioned for locking the column actuators. This is accomplished by the universal lock release mechanism, or by changing to key-drive. Pivotally mounted on the transverse supporting bar 81 at the right-hand side of the machine is a rocker arm 95 the upper end of which is slotted to receive one of the grooves of the column actuator lock shift rod 78. A roller 96 projects rearwardly from said rocker arm 95 and normally enters a notch 97 in the "clear" key 98, with the result that the parts remain in normal, or key-set, positions. When the key 98 is depressed, its stem above the notch 97 forces the roller 96 and the upper end of the rocker arm 95 toward the right of the machine, so that the shift rod 78 is likewise moved toward the right, thereby, through the arms 75, shifting the connections 73 toward the right (toward the left as viewed in Fig. 10) to move all the locks 67 to their extreme releasing positions and the projections 92 away from the numeral keys which they have been holding down so that any set numeral keys are permitted to rise under the action of their springs to normal positions. When the "clear" key 98 is released its spring return mechanism, corresponding to the spring return mechanism 28 of the numeral key, will restore it to normal position to reengage the notch 97 with the roller 96. This permits the springs 91 to throw all of the control bars 70 and their corresponding column actuator locks 67 back to locking positions. If desired, however a resetting may be effected in the same columns that had a previous setting, by merely depressing the numeral keys representing the digits of the new setting, or where a cipher is desired, by operating the columnar release as hereinafter explained. The depression of a key releases any other key set in the same order.

There is also provided a columnar release mechanism employed for the individual column actuator locks 67, for example when it is desired to release either the column actuator lock of any selected column or to move the control bar 70 to its extreme releasing position, to release a numeral key 25 which has been previously "set" in that column. This columnar release mechanism may be employed for correcting an error in the key setting of any column, and permits a new key setting to be made in any column, or for striking a cipher in any column, if a key has been previously set in that column without making it necessary to release the key setting in other columns, as would happen in an operation of the "clear" key 98. Referring especially to Fig. 9, each control bar 70 is provided at its extreme front end with a horizontal shoulder 99 on which rests the lower end of the key stem 100 of the small columnar release or "cipher" key 101. When said key 101 is depressed, the shoulder 99 is moved downwardly to force the lower edge of the lock bar 70 toward the right of the machine, to release a numeral key 25 the shoulder of which is retained beneath a projection 92 of said control bar. Inasmuch as there are release or "cipher" keys 101 for each column, the setting of any individual column is subject to individual control and to resetting in any manner desired by the operator. When the finger is removed from a depressed key 101 the parts will be restored to normal position by the springs 91 corresponding to the control bar 70 which has been shifted by said key 101 to releasing position.

The setting of the machine for power-driven actuation unlocks the crank 56 for the operation of the universal actuator. When the "crank drive" key 88 is depressed, the movement of the shift rod 78 toward the right of the machine withdraws the left-hand end 102 of said rod from locking position in a hole or socket 103 in the disk 61 of the main power or crank shaft 57, thus freeing the shaft 57 and crank 56 for movement. This construction also prevents setting of the machine from power-driven to key-driven actuation, except when crank 56 and disk 61 are in their normal positions, since the movement of the disk away from normal also moves the hole 103 out of registry with the shift bar 78 and the latter can not be operated by the "key-drive" key 83 to release the column locks for key-driven operation of the actuating mechanism. When the disk 61 is in normal position, the crank 56 and shaft 57 will be locked against operation by the setting of the machine for key-drive, since the end 102 of the shift bar enters the hole 103 to prevent rotation of the disk 61.

The operation of the universal actuator, in key-set power-driven actuation of the machine, is shown in Figure 7. As hereinbefore stated, each complete rotation of the crank 56 produces first a clockwise movement and next a counter-clockwise movement of the shaft 40 and ordinal universal actuator plates 41. Those column actuators which have not been set for power-driven operation are locked against movement by their corresponding column locks 67, but, in the various orders in which key-setting has taken place, the respective column actuator arms 29 may move variably downwardly, in accordance with the digital value of their respective key-settings, until their motion is arrested by the digital control device hereinafter explained. The dual flexible link mechanism connecting the universal actuator plates with the column actuators in the several orders, permits the constant oscillatory motion of the plates 41 in all orders, although column actuators have been set for relatively variable movements and in some orders, as required by the example to be performed, no setting of the column actuators may have taken place at all. Moreover, this operation is accomplished by the invention with a minimum resistance to the movement of the crank. In fact, the resistance to crank movement is inversely proportional to the digital value of the key-setting in the various orders and to the number of orders set for operation, so that the greater the digital value of the factor set-up on the keyboard, the less becomes the resistance. This is accomplished by releasing from all tension the springs 44 of the lower dual flexible link mechanisms, so that no resistance is imparted by said springs 44 to either the downward or the upward movement of the column actuator arms 29, and by releasing from tension the springs 50 of the upper flexible link mechanisms 42 so long as the corresponding column actuators are moving with the universal actuator plates 41 in either direction. This operation is as follows: On the clockwise movement of a universal actuator plate 41, the upper flexible link mechanism 42 pulls down with said plate 41 the horizontal arm 29 of the corresponding column actuator, if said actuator has been previously set by the depression of a numeral key 25. There is no stretching or tensioning of the spring 50 so long as the arm 29 is moving downwardly, and, inasmuch as the stud 49 is traveling in the slot 48 of the ram of the lower flexible link mechanism 43, there is likewise no stretching or tensioning of the spring 44.

When, however, the downward movement of the column actuator arm 29 has been completed to effect the required incremental accumulation and said column actuator arm has been arrested by the digital stop device, the spring 50 will be stretched or tensioned proportionally with the remainder of the clockwise stroke of the universal actuator plate 41. During the counter-clockwise return stroke of the universal actuator plate 41, the stud 49 travels freely in reverse direction in the slotted head of the ram 43 without tensioning the spring 44, and the pull on the spring 50 of the upper flexible link mechanism being released, the spring 50 retracts to lift up its ram 52 and also to restore the horizontal column actuator arm 29 to its normal elevated position. Inasmuch as there is no resistance to the downward movement of the column actuators, during the oscillatory motion of plates 41, the springs 50 have merely a minimum load to carry in depressing column actuators and thus the tension derived from such actuators as are locked against depression is reduced to a minimum. If there has been no key-setting of a column actuator in any order of the machine, the horizontal arm 29 is held against movement by its corresponding column lock 67, and the tensioning of the spring 50 of the corresponding flexible link mechanism will commence at the beginning of the clockwise stroke of the universal actuator plate 41, and the return movement of said plate 41 allows the tensioned spring to pull back its ram 52 into normal elevated position.

The digital stop or control device operates to insure accuracy of movement of the column actuators in transferring their incremental accumulations to the accumulator mechanism, whether the machine be operating in key-driven actuation or in key-set power-driven actuation. Pivotally mounted at 104 on the forward arm 38 of the adding sector of each column actuator is a digital stop bar 105 which extends to the front of the machine and has its front end pivoted at 106 to the top of a rocker arm 107, the latter being pivoted on a cross-rod 108. The said bar 105 is provided with a series of eight stops or projections 109 respectively corresponding to the column of digital or numeral keys of its corresponding order, with the exception of the nine key and adapted to arrest the rearward movement of said bar 105 by the depression or setting of a key 25, (see Figs. 2, 5, 6, 7 and 10). The nine key and the movement of the sector 33 corresponding thereto represents the extreme movement of said sector, and such movement is preferably arrested by a fixed stop 109a attached to the framework, although, if desired, a further stop 109 for the nine key could be provided on the stop bar. The stops or projections 109 are located at different distances in front of the keys with which they respectively co-operate, the stop 109 corresponding to the "1" key being nearest to said key and the stop corresponding to the "9" key being the farthest away. When a key 25 is actuated in key-driven actuation or set for power-driven actuation, the adding sector 33 of the corresponding column may move downwardly until the bar 105 has shifted the corresponding stop into engagement with the key depressed, whereupon the movement of the sector 33 is arrested, and the column actuator will either make a cushioned stroke, as heretofore explained, during key-driven actuation or will stop moving permitting stretching of the corresponding flexible link mechanism spring 50.

In key-driven actuation, the keys 25 have a variable motion, as hereinbefore explained, in accordance with their digital values, but in key-set actuation the several keys 25 of each order have a relatively constant movement, both downwardly and upwardly, notwithstanding their digital values. In operating the machine a different mode of touch is employed in setting the keys during key-set operation from the mode of touch employed in key-driven operation. Only a very light touch is necessary to bring the upper lug on the keystem below the projection 92 because the keystems have sufficient travel before engaging the column actuators to permit the upper lug on the keystem to pass below the projection 92, and during such travel substantially no resistance must be overcome in key-setting in comparison to the resistance that must be overcome in key-driven actuation, because the only spring resistance that needs to be overcome in key-setting is the spring 91 and only a very little of the resistance of the spring at the lower end of the key depressed that returns the key to its uppermost position. The column actuators and their springs provide sufficient resistance that the touch employed in key-set operation is not sufficient to initiate its movement and thus the spring resistance of the column actuators is sufficient during key-set operation to eliminate the possibility of erroneous movement of it during a key-setting operation, so that the care and skill required of an operator in setting the keys in key-set operation is anything but extreme, and less than required in key-driven operation and in many other key-set machines. The digital-control mechanism of the invention adapts the same series of stop lugs 109 on bar 105 to either the variable movement of the keys in key-drive or the relatively constant movement of the keys in power-drive, by reason of the following arrangement of the stops 109 on bar 105 with respect to the stop shoulders 25a on the co-operating keys. Inasmuch as the bar 105 moves progressively increasing distances rearwardly as determined by the value of the key operated, whether in key-set or key-drive, it is necessary that the stop 109 on bar 105 be differentially spaced from the respective keys with which they co-operate. But this arrangement brings, for example, the stop corresponding to the "6" key under the shoulder 25a of the "5" key, the stop corresponding to the "7" key under the shoulder of the "6" key, and the stop corresponding to the "8" key forwardly of the shoulder 25a of the "7" key. Consequently, it is necessary to lower the stops comparatively and shoulders 25a just mentioned, so that the stops may be moved to their proper keys, under power-drive, without interference by a stop of a higher-value key. Thus, if the "6" stop of the bar 105 is to be lowered to accommodate the setting of the "5" key, the number "7" stop of the bar must be still lower to accommodate the number "6" key setting, so on for the number "8" stop for the number "7" key, and, if a number "9" stop be provided, the "9" stop for the "8" key. The stops must also be lowered for increasing distance in the progressive order mentioned to accommodate the alternative key-drive as well as the power drive, and the lowering of the stops 109 and the shoulders 25a on the keys must be properly proportioned to both drives.

The motion of the adding sectors 33 of the column actuators is transmitted to the accumulator mechanism by ordinal internal ratchet mechanisms, which operate on the same principle as the internal ratchet mechanisms of the standard "Comptometer" type exemplified in the prior patents hereinbefore mentioned, for permitting the numeral wheel and transmitting gearing of the accumulator mechanism to remain idle during the rearward downstroke of the corresponding adding sector 33, but to be actuated to effect the accumulation during the return stroke of said sector. These ordinal ratchet mechanisms are mounted on a supporting rod or shaft 110 that extends transversely through the stationary framework of the machine. Each ratchet mechanism includes a gear 111 in mesh with the rack teeth of the corresponding ordinal sector 33, an internal ratchet 112 fixed to said gear 111, a lantern wheel 113, a gear 114 fixed to said lantern wheel and adapted to mesh with an order of the accumulator mechanism, (see Figs. 5, 12 and 13) and the usual internal pawl (not shown) interposed between the internal ratchet and the lantern wheel for clutching the lantern wheel and gear 114 to the ratchet 112 only during the return up-stroke of the corresponding adding sector. Co-operating with the lantern wheel are the usual stop devices for preventing erroneous operation, said devices including the spring actuated back-stop pawl 115, and the spring actuated over-throw-prevention pawl 116.

In accordance with the invention, the accumulator mechanism is optionally stationary with respect to the several orders of the actuating mechanism for key-driven actuation, or for key-set power-driven additive actuation, or shiftable for key-set power driven multiple stroke actuation, or, if desired, for key-driven multiple stroke actuation. The accumulator mechanism includes the numeral wheels, and the interposed transmission gearing mechanism which receives direct incremental actuation from the column actuators and transfers it to the numeral wheels of the corresponding orders and also receives or transmits indirect actuation from a lower order gearing to a higher order gearing for effecting carrying of the tens from order to order, whenever a numeral wheel of a lower order passes the "9" point, whether in gear with the actuating mechnism or not. The carriage comprises a supporting framework including skeleton plates 117 interposed between the various orders of the accumulator and tied together by transverse tie rods 118, and a top inclosing casing 119. The carriage is both pivotally and slidably mounted on a rod 120 supported from the top of the fixed casing of the machine and is preferably constructed of a width somewhat greater than the width of the stationary casing to support a number of accumulator orders in excess of the orders of the actuating mechanism. This construction provides a machine of large capacity for multiple stroke calculation, whether positive as in multiplication or negative as in division. In the machine illustrated in the drawings there are eight columns of the actuating mechanism and seventeen columns or orders of the accumulator mechanism. Mounted on the stationary frame of the machine is a bed plate 121 provided with a series of notches or grooves 122, said grooves marking the various ordinal positions of the carriage when at rest and being adapted to co-operate with a depending lock arm 123 supported by the carriage which enters one of the grooves when the carriage has been lowered into proper registering position and the carriage is held for shifting. For a more complete description and illustration of the means, in this case consisting of the grooves or notches 122, for maintaining the lowered carriage in proper registering position with respect to the parallel columns or orders of adding mechanisms, reference is made herein to my copending application Serial No. 107,527, filed May 7, 1926, for calculating machines. The numeral wheels 124 for registering accumulation are each provided with the usual nine digits and with the zero mark, which may be viewed through sight openings 125 in the cover plate of the carriage. The numeral wheels of the respective orders of the accumulator mechanism are mounted to rotate on cross-rods or fixed supporting shafts 126 supported by the framework of the carriage and each numeral wheel is provided with its operating gear 127 in mesh with a gear 128 mounted on a parallel cross-rod 129. Direct or indirect actuation is transmitted by the transmission gear mechanism of the accumulator to the gear 128 and the latter in turn transmits the accumulative motion to the gear 127 for rotating the numeral wheel in accordance with the incremental movement of either direct or indirect, or concurrently direct and indirect actuation.

The transmitting gear mechanism of the accumulator receives the actuation of the column actuators from the gears 114 of the internal ratchet mechanisms and transfers such actuation to the numeral wheels of the corresponding orders. It also embodies a carrying mechanism that employs the same gear transmission for effecting a carrying of the tens from lower orders to higher orders, whenever the numeral wheels of lower orders pass the "9" point. The carrying movement in the higher order may take place, in accordance with the mechanism of the invention, concurrently with a direct actuation of said higher order by its own corresponding column actuator without in any manner swallowing up the carrying impulse or entailing loss of carry. The accumulator mechanism of each order supported by the carriage comprises a pair of juxtapositioned combined internal and external gears 130 and 131, the external gear teeth 132 of gear 130 being in mesh with the gear 128 and the external teeth 133 of the right-hand gear 131 being in mesh with the gear 114 of the internal ratchet mechanism. The gear 131 is loosely journaled upon a stub shaft 134 supported by a skeleton plate of the carriage frame and the left-hand gear 130 is loosely journaled upon a short stub shaft 135 which passes through the hub 136 of gear 130, the hub 137 of gear 131, and is itself mounted for rotary movement in a socket 138 formed in the stationary stub shaft 134. The external teeth of gear 131 are differential with respect to the external teeth of gear 130, for example gear 131 may have thirty-six external teeth while gear 130 has forty external teeth. The internal teeth 139 of gear 131 are also differential with respect to the internal teeth 140 of gear 130, for example, gear 131 may have forty-four internal teeth 139 and gear 130 may have forty internal teeth 140. The short stub shaft 135 is concentric with the axis of rotation of the gears 130 and 131 and itself constitutes a carrier for a pair of differential epicyclic pinions 141 and 142, pinion 141 corresponding to gear 131 and meshing with its internal teeth 139 and pinion 142 corresponding with gear 130 and meshing with its internal teeth 140.

The pair of differential pinions 141, 142, are fixed together and rotate about a common axis 143 that is eccentric to the axis of rotation 135 of gears 130 and 131. For example, pinion 141 may have twenty-two teeth and pinion 142 eighteen. Said pinions are journaled on the outer end of a carrier arm 144 fixedly supported by and projecting from shaft 135 in a direction transverse to its axis of rotation. The pair of differential epicyclic pinions 141, 142, constitute the interposed transmitting gearing for transmitting direct actuation from the gear 114 of the internal ratchet mechanism to the numeral wheel gear 127 of the corresponding order. The transmission of direct incremental actuation may take place while the epicyclic pinions are moving only about their axis 143 and no epicyclic movement of said pinions about the axis 135 is taking place. In fact, this is the mode of operation except when a carry is being transferred from a lower order, but the carrying transfer which involves an epicyclic movement of the pair of pinions does not disturb the work of the pinions in transmitting direct actuation by rotation on axis 143. The transmission of direct actuation is as follows: On the up-stroke of the column actuator arm the internal ratchet mechanism gear 114 is rotated for a distance sufficient to move the numeral wheel the number of numeral spaces required by the key actuated or set. The movement of gear 114 is transmitted to external gear 133 which in turn rotates internal gear 139, internal gear 139 rotates the pair of differential pinions 141, 142, pinion 141 meshing with gear 139 and pinion 142 meshing with gear 140 to rotate the latter. The rotation of gear 140 also rotates external gear 130, thereby rotating gear 128 and the numeral wheel gear 127. The gearing just described is so proportioned that external gear 132 turns a half rotation during each complete rotation of the corresponding numeral wheel gear 127 and numeral wheel 124.

The epicyclic movement of the pair of differential pinions 141, 142, is employed to receive and impart to the combined internal and external gear 130 a further one-step movement when a carry is released by the next lower order of the machine, that is when the numeral wheel of the next lower order passes between the "9" point and zero. The left-hand face of each combined internal and external gear 130 is provided with gear arms 145 to a projecting stud 146 of which is secured one end of the carrying spring 147 which embraces the hub 136 of the gear 130. The other end of the carrying spring 147 is secured to a stud 148 projecting from a spider 149 mounted on the right-hand end of and rigidly secured to the stub shaft 135 of the pair of differential pinions of the next higher order. The spider 149 supports a disk 150 having a flanged periphery 151 provided with a pair of diametrically opposite inward projections 152, the purpose of which will appear hereinafter. The disk 150 constitutes an escapement wheel for the carrying transfer in the next higher order, whenever a carry is to go over from a lower order. Projecting diametrically oppositely from the spider 149 of the escapement wheel 150 is a pair of carry-storage stop-lugs 153, of which first one and then the other is adapted to retain the escapement wheel 150 against rotation and the differential pinions 141, 142, of the higher order against epicyclic movement, by the co-operation of a carry-storage-retaining latch 154. The storage retaining latch 154 of each order of the machine is mounted on a transverse rod 155 supported by the framework of the carriage and is provided with an actuating spring 156 for moving the latching detent 157 into engagement with a lug 153 of the escapement wheel 150. A depending arm 158 which is adapted to engage a transverse rod 159 limits the pull of the spring 156 on the latch 154. Projecting from the free end of said latch 154 is a dolly roll 160 which is depressed to lower the free end of the latch 154 and to move the detent 157 to release the escapement wheel 150, whenever a carry is to go over from the lower to the higher order. This occurs at each one-half revolution of the lower order gear 130, at the time when the numeral wheel of said lower order is passing between the "9" point and zero. Projecting from the arms 145 of said gear 130 is a pair of carry release cams 161 positioned diametrically oppositely with respect to the gear and being one or the other adapted to engage and depress the dolly roll 160 of the latch 154 of the higher order at the moment of carry release. During direct actuation by its own column actuator the combined internal and external gear 130 of each lower order of the machine acts as a carrying spring winding gear for the purpose of winding the carrying spring 147 to impart a carry-producing impulse to the escapement wheel 150 of the higher order. The carrying spring 147 is wound during each one-half revolution of the gear 130 between the points of carrying release by the cams 161. At the moment of carry release the carrying spring 147 has power stored in it sufficiently to turn the escapement wheel 150 of the higher order, to which said carrying spring is also attached, and this effects an epicyclic movement of the pair of differential pinions 141, 142, of said higher order, by reason of the turning of the carrier 135. By such epicyclic movement of the pinions 141, 142, in the next higher order, because of the differential number of teeth in the pinions themselves and in the combined internal and external gears with which said pinions mesh and co-operate, the gear 130 of the higher order is imparted a movement sufficient to actuate the numeral wheel of said higher order one extra numeral space required by the carrying transfer. When released by cam 161, the retaining latch is restored to normal position by its spring 156 to engage the carry-storage retaining lug 153 opposite to the one just released, until the next carrying transfer operation. Until said latch 154 has moved back to its normal position, the escapement wheel 150 is prevented from completing its full half-rotation by one of the inward projections 152, which engages the detent 157 of the latch, should the latch be in any position other than normal, by any delayed key action that would hold cam 161 in contact with the dolly roll of the latch, and shifts by a camming action the detent of said latch into normal position in engagement with the lug 153.

In key-driven actuation, or in key-set power-driven additive actuation, whether positive or negative, the carriage containing the accumulator mechanism is stationary relatively to the actuating mechanism throughout the performance of the entire example, preferably with the first order of the accumulator mechanism in operative engagement with the first order of the actuating mechanism. In multiple place key-set power-driven calculation, or if desired in key-driven multiple-place calculation it is or may be necessary, however, to shift the carriage from order to order of the machine in order to effect the accumulation of the multiple strokes represented by each digit of one factor. For example, in performing multiplication, a multiple place factor, such as the multiplicand, would be set up by the keys 25. If the multiplier is also multiple place, the carriage may be set, first, with the units order of the carriage corresponding with the units order of the actuating mechanism, and the crank 56 would be turned for a number of revolutions corresponding to the digital value of the units place of the multiplier. After this is accomplished, the carriage is shifted and the crank then turned for a number of revolutions corresponding with the tens place of the multiplier, and so on until each ordinal digit of the multiplier is exhausted. For shifting the carriage, there are provided at its opposite ends handles 162 so that the carriage may be first swung upwardly on its supporting rod 120 and then shifted transversely of the stationary casing of the machine, as required.

The operation of lifting the carriage disengages the gears 131 of the ordinal accumulator mechanism from the gears 114 of the ordinal actuating mechanism, and this would, unless prevented, release the ends of the carrying springs 147 which are attached to the gears 130. In order to prevent the carrying springs from unwinding reversely and losing their tension, there is provided in each order of the accumulator mechanism a locking lever 163 (see Fig. 12) for locking the gears 130 against movement to release the carrying springs, whenever the respective gear trains are disengaged from the actuating mechanism. The locks 163 are pivoted at their lower ends at 164 to the several skeleton plates of the carriage frame and the upper ends of said lock levers are provided with detents 165 adapted to move into engagement with the external teeth of the gears 131, when the locks 163 are released by the lifting of the carriage. The said lock levers 163 are provided with horizontal arms 166 which engage a ledge of the bar 121 to throw the detents out of engagement with such gears as are to be engaged with the actuating mechanisms, when the carriage frame is in its lowered position. When, however, the carriage is lifted springs 167 connecting the vertical arms of the levers 163 with the rod 155 are released to pull the detents 165 of said levers forwardly into locking engagement with the gears 131. As the gears 130 are not locked, even in those orders of the accumulator in which locks 163 have not been released by engagement with bar 121, the carrying transfers may nevertheless take place although such orders may not be in operative position with respect to any part of the actuating mechanism.

The invention provides a counter mechanism for registering the crank rotations, in multiple stroke calculation, for each order of one factor of the example, for instance, the multiplier. There is provided in a series of orders of the carriage beginning with the units order a counter wheel 168 having on its face the nine digits and the "0" mark, the several counter wheels being mounted on shafts 169 supported by the skeleton plates of the carriage frame. The registrations of the several counter wheels are viewed through sight openings 170 in the casing plate of the carriage and located forwardly of the sight openings of the accumulator registering wheels. Each counter wheel is provided with a pair of ratchets 171 and 172, the ratchet 171 being the driving ratchet for said wheel and the ratchet 172 the retaining ratchet for preventing backward rotation thereof. A pivoted pawl 173 impelled by a spring 174 engages the teeth of the retaining ratchet 172 for preventing backward rotation of the counter wheel 168. Each counter wheel 168 is provided with a spring 175 encircling its hub and having one end secured to the wheel and the other at 176 to the stationary frame, for turning the wheel backwardly to zero, in zeroizing, as will be hereinafter explained. For actuating the counter wheels successively, there is provided in the units order of the actuating mechanism a bell crank lever 177 at the upper end of the vertical arm to which is pivoted a spring pressed pawl 178 adapted to engage the teeth of the ratchet 171. The horizontal arm 179 of the bell crank lever is provided at its rear end with a roller 180 which rides on a cam 181 secured to the right-hand end of the oscillatory shaft 40 of the universal actuator 39. The cam 181 is provided with a cam projection 182 for lifting the roller 180 and arm 179 of the bell crank lever during each complete oscillation of the shaft 40. As the arm 179 rises the pawl 178 moves in a clockwise direction to advance the ratchet of the counter wheel one numeral space. This operation takes place successively in the counter wheels as the carriage is shifted in multiple stroke actuation. A spring 183 one end of which is secured to the vertical arm of the bell crank lever 177 and the other end to a skeleton plate of the fixed frame maintains the roller 180 in constant engagement with the surface of the cam 181 and also serves to restore the pawl 178 to normal position after each one-step operation of the counter wheel.

Zeroizing mechanism is provided for restoring to zero the several orders of the accumulator mechanism and also the several orders of the counter mechanism. A zeroizing shaft 184 extends transversely through the framework of the carriage and is provided at its right-hand end with a zeroizing handle 185 (see Fig. 3) by which the shaft may be swung back and forth. The handle 185 extends beneath the cover of the carriage and in zeroizing may be pulled forwardly toward the carriage shift handle, as indicated by the dot-and-dash line in Fig. 3. The zeroizing shaft 184 is provided with ordinal notches 186 within which seat the depending zeroizing release levers 187 corresponding to the several orders of the accumulator mechanism. These levers are pivoted at their upper ends on a rod 188 supported by the skeleton framework of the carriage and are retained in their normal positions by the springs 156 connected with the latches 154. The lower ends of said zeroizing release levers project into the path of movement of the lock levers 163, and when said release levers 187 are moved rearwardly toward the left, as viewed in Fig. 12, their motion is transmitted to the lock levers 163 to push the locking detents away from engagement with the gears 131 of the accumulator trains and to release the carrying springs 147. This motion occurs whenever the carriage has been lifted and the zeroizing lever 185 concurrently pulled forwardly to turn the shaft 186 so that the levers 188 are forced rearwardly by the engagement of the edges of the recesses in said shaft. Inasmuch as the gears 130 are released by disengagement from the gears 114 the carrying springs 147 are free to turn gears 130 and with them through the other transmitting gearing all the numeral wheels backwardly to the zero point. When the numeral wheels of the accumulator mechanism have arrived at zero the reverse rotation imparted by the released carrying springs 147 is arrested to retain the numeral wheels in zero positions by means of zero stops 190 provided at diametrically opposite positions on the respective gears 130 (Figs. 12 and 13). One or the other of these stops 190 is engaged by a stop detent 191 mounted at the end of the zeroizing stop lever 192, whenever the gear 130 has been turned so that its corresponding numeral wheel 124 is at zero. The zeroizing stop levers are pivoted at their upper ends on the shaft 188 and are connected by springs 189 with the release levers 183 to form flexible bell-cranks. The lower ends of the stop levers are moved downwardly to position the stop detents 191 in the path of the stops 190, whenever the zeroizing shaft 184 is turned. A spring 196 fastened to a hook 197 formed by hollow milling of the shaft, winds around the shaft 184 when turned in a zeroizing operation and restores the shaft and its operating handle 185 to normal.

Zeroizing of the counter wheels 168 may be effected, as disclosed in the present embodiment, concurrently with the zeroizing of the accumulator wheels 124. For this purpose the zeroizing stop levers 192 corresponding with the orders of the counter wheels are provided at their lower ends with release fingers 193 adapted to engage projections 194 formed on the upper ends of the back-stop pawls 173 of the respective counter wheels and to throw said pawls out of engagement with the ratchets 172, whenever the levers 192 are lowered during zeroizing of the accumulator mechanism. Inasmuch as the lifting of the carriage in zeroizing moves any ratchet 171 from engagement with its operating pawl 178 and all the ratchets 172 are released by the rearward movement of the back-stop pawls 173, the counter wheels may turn rearwardly to zero under the action of their zeroizing springs 175. When the respective counter wheels have arrived at zero positions, their backward rotation is arrested by the zero stop pin 194 on the ratchet 172 coming to a stop against an arm 194a loosely mounted on the hub of the counter wheel and which in turn engages the fixed stop 195, fastened to the frame of the carriage. The loose arm 194a serves as a yielding feature of the stop device that may lift as the pin 194 engages it, when the counter wheel moves forwardly to the "9" position, the pin 194 being positioned nearer to the axis of shaft 169 than pin 195 to prevent interference with the movement of pin 194, the space occupied by pins 194—195 being greater than each one step movement of the counter wheel, or the space between "9" and zero.

Features disclosed but not claimed herein form the subjects matter of my copending applications Serial Numbers 620,504; 620,505; 620,506 and 620,507, all filed July 1, 1932.

The invention as hereinabove set forth may be variously embodied within the scope of the claims hereinafter made.

I claim:

1. In a calculating machine, the improvement characterized by keys, and key-driven actuating mechanism for transferring increments of calculative actuation to an accumulator mechanism, and flexible means whereby the keys may be moved a distance in excess of that required for calculative actuation of the accumulator mechanism.

2. The combination, in a calculating machine, of key-actuated adding mechanism comprising accumulating devices and actuating devices, and flexible means whereby said actuating devices may be moved beyond any additive degree of actuation of any individual key.

3. The combination, in a calculating machine, of key-actuated calculating mechanism comprising accumulating devices and actuating devices, and flexible means whereby said actuating devices may be moved beyond the maximum amount required for incremental calculative movement of any individual key.

4. In a unitary key-driven and alternatively key-set power-driven calculator having a plurality of ordinal keys having a longer key-driving movement and a shorter key-setting movement and actuating mechanism either driven or set for actuation thereby, the improvement characterized by a digital control mechanism operating in key-driven and in key-set power-driven actuation, for controlling the operation of the actuating mechanism proportionately with the digital value of a key operated.

5. In a key-driven and alternatively key-set power-driven calculator including the column actuating mechanism and a universal actuating mechanism for the power-drive, the improvement characterized by spring-means comprising opposing springs one of which is tensioned and the other of which is relieved of tension while the universal actuating mechanism is at normal for the ordinal actuation of the column actuating mechanism during key-drive.

6. In a key-driven and alternatively key-set power-driven calculator including the column-actuating mechanism and the key mechanism furnishing spring-power in key-driven actuation, the improvement characterized by a universal actuating mechanism for the power drive comprising means to relieve the spring-tensioning necessary in key-driven actuation, said universal actuating mechanism transmitting calculative actuation to any selected orders during power drive of the machine.

7. In a key-driven and alternatively key-set power-driven calculator, in combination: column actuators; springs connected with said column actuators and normally under tension; and means, operable during key-set power-driven actuation of the calculator, for relieving such spring tension to permit free movement of the column actuators without spring resistance.

8. The combination, in a calculating machine, of a column actuator normally under spring tension, and means for relieving the spring tension on the column actuator to permit free movement of the latter without said spring resistance.

9. The combination, in a calculator alternatively key-driven or key-set power-driven, of a column actuator normally under spring tension, and means, operable during key-set power drive of the calculator, for relieving the spring tension from the column actuator to permit free movement of the latter without said spring resistance.

10. In a calculator, in combination: a sector for transmitting increments of calculative actuation to an accumulator; a stop bar connected to said sector and movable therewith; a columnar series of keys co-operating with said stop bar to limit the calculative movement of the sector; and an optionally operable key and power drive for the sector.

11. In a calculator, in combination: a sector for transmitting increments of calculative actuation to an accumulator; a stop bar connected to said sector and movable therewith; a columnar series of keys having a longer key-driving movement and a shorter key-setting movement co-operating with said stop bar to limit the calculative movement of the sector.

12. In a calculator, in combination: an adding sector; stop mechanism connected with said sector and movable therewith; a columnar series of keys co-operating with said stop mechanism to limit the additive movement of the sector and having a longer key-driving movement and a shorter key-setting movement; and means for driving said sector alternatively in key-driven and in key-set power-driven actuation.

13. In a calculating machine, in combination: a plurality of column actuators; an oscillatory universal actuator common to all the column actuators; and a double flexible link mechanism connecting each column actuator with the universal actuator, the flexible links of each mechanism being alternately stretched and permitted to contract during oscillatory movement of the universal actuator.

14. In a calculating machine, in combination: column actuators; a universal actuator; a pair of flexible link mechanisms connecting each column actuator with the universal actuator, each flexible link mechanism including a spring and a ram encircled thereby, said rams having sliding connections with the universal actuator; and keys for depressing the column actuators.

15. In a calculating machine, in combination: key-actuated column actuators; a universal actuator; and a pair of flexible link mechanisms interposed between the column actuators and the universal actuator, each flexible link mechanism including a ram and an encircling spring, but only one of said springs being tensioned during operation of the column actuators by the keys.

16. The combination, in a calculating machine, of a column actuator, and spring mechanism connected with said column actuator and including a pair of springs operating in opposite directions with respect to said actuator, so that by pulling on one spring and releasing the tension from the other the column actuator may be oscillated back and forth.

17. The combination, in a calculating machine, of column actuators, an oscillatory universal actuator, and a dual flexible link mechanism interposed between the universal actuator and the column actuators to impart additive motion.

18. An actuating mechanism for calculating machines, comprising: a column actuator, a spring for actuating the same, and a ram encircled by said spring and connected therewith, said ram being movable in one direction to release the spring tension and in the other to impart tension to the spring.

19. In a calculating machine, the improvement characterized by key-driven ordinal adding mechanism arranged in columnar groups, said adding mechanism including an actuating mechanism, and accumulator mechanism that is shiftable or interchangeable with the various orders of the actuating mechanism, the said shiftable accumulator mechanism including register wheels, and transfer devices, the latter being automatic in action and having provision for storing power by increments from the turning of the lower wheels to carry the tens to the higher order wheels, whenever a lower order wheel passes from the nine to the zero point of registration, and means for locking the elements of the accumulator mechanism when the latter is being shifted.

20. In a calculating machine, the improvement characterized by a key-driven ordinal adding mechanism arranged in columnar groups and including an actuating mechanism and an accumulator mechanism that is shiftable and interchangeable with the various orders of the actuating mechanism and keys having a longer key-driving movement and a shorter key-setting movement.

21. In a calculating machine, the improvement characterized by alternatively key-driven and key-set power-driven ordinal adding mechanism arranged in columnar groups and including an actuating mechanism and an accumulator mechanism that is shiftable and interchangeable with the various orders of the actuating mechanism and keys having a longer key-driving movement and a shorter key-setting movement.

22. In a calculating machine, the improvement characterized by a shiftable accumulator register combined with an automatic carrying mechanism, the latter including means for storing in the lower orders power as the register wheels are actuated and for transferring such power to the higher orders to carry the tens and a series of orders of actuating mechanisms to effect registration of the accumulator mechanism, and means for locking the elements of the accumulator mechanism when the latter is being shifted.

23. The combination, in a calculating machine, of a column actuator, an oscillatory universal actuator, and a pair of flexible link connections interposed between the column actuator and the universal actuator whereby the oscillatory movement of the universal actuator in one direction stretches one link and permits the other to contract, and, in the other direction, relieves the stretching of the previously stretched link.

24. The combination, in a calculating machine, of column actuators, an oscillatory universal actuator, a dual flexible link mechanism, including springs, interposed between the universal actuator and the column actuators to impart additive motion, and a key drive for such column actuators, whereby one of said springs will return the column actuator in additive actuation.

25. In a calculating machine, the improvement characterized by adding mechanism, a column of numeral keys adopted to be moved variably in key-driven actuation and to have a relatively constant motion in key-set actuation, combined with a stop bar co-operating with the keys in either actuation for limiting the additive actuation of the adding mechanism, said keys having a longer key-driving movement and a shorter key-setting movement.

26. In a calculating machine, the improvement characterized by adding mechanism, a column of numeral keys having stop shoulders and adapted to be moved variably in key-driven actuation and to have a relatively constant motion in key-set actuation, combined with a stop bar having a series of stops arranged to co-operate with said stop shoulders of the keys in either actuation, said keys having a longer key-driving movement and a shorter key-setting movement.

27. In a calculating machine the combination of a series of column-actuators arranged in orders, a series of numeral keys for each actuator, said keys having a longer movement for key-drive and having a shorter movement for key-setting of the actuators, an accumulator, and means for connecting said accumulator with said actuators for the operation of the accumulator, means for holding any of said keys and its actuator set, means releasable by setting of a numeral key for holding an actuator from operation, and universal driving means having connection with each actuator so set for operating the same.

28. In a calculating machine the combination of a series of column-actuators arranged in orders, a series of numeral keys for each actuator, an accumulator having its elements connectable with various of said actuators respectively, adjustable means releasable by the depression of a numeral key for holding its actuator from operation, and common driving means having yielding connection with each actuator for operating the actuators so set.

29. In a calculating machine the combination of a series of column-actuators arranged in orders, a series of numeral keys for each actuator, said keys having a longer movement for key-drive and having a shorter movement for key-setting of the actuators, an accumulator having its elements connectable with various of said actuators respectively, adjustable means releasable by the depression of a numeral key for holding an actuator from operation, and common driving means having connection with each actuator for operating the actuators so set.

30. In a calculating machine the combination of a series of column-actuators arranged in orders, a series of numeral keys for each actuator, said keys having a longer movement for key-drive and having a shorter movement for key-setting of the actuators, an accumulator having its elements connectable with various of said actuators respectively, adjustable means releasable by the depression of a numeral key for holding its actuator from operation, and driving means having yielding connection with each actuator for operating the actuator so set.

31. In a calculating machine the combination of a series of column-actuators arranged in orders, a series of numeral keys for each actuator, an accumulator having its elements connectable with various of said actuators respectively, said accumulator being liftable out of connection with said actuators, adjustable means releasable by the movement of a numeral key for holding an actuator from operation, and driving means having yielding connection with each actuator for operating the actuators so set.

32. In a calculating machine the combination of a series of column-actuators arranged in orders, a series of numeral keys for each actuator, an accumulator having its elements connectable with various of said actuators respectively, said accumulator being movable away from said actuators, means for locking the elements of the accumulator when it is moved, adjustable means releasable by the movement of a numeral key for holding an actuator from operation, and driving means having yielding connection with each actuator for operating the actuators so set.

33. In a calculating machine the combination of a series of column-actuators arranged in orders, a series of numeral keys for each actuator, sectors operated by said actuators respectively, an accumulator having ordinal gears engageable with various of said sectors, adjustable means releasable by the depression of a numeral key for holding an actuator from operation, and driving means having yielding connection with each actuator.

34. In a calculating machine the combination of a series of column-actuators arranged in orders, a series of numeral keys for each actuator, sectors operated by and movable with said actuators respectively, and an accumulator having ordinal gears engageable with various of said sectors, said accumulator being pivotally mounted and movable with its gears towards and from said sectors for the engagement and disengagement of the gears.

35. In a calculating machine the combination of a series of column-actuators arranged in orders, a series of numeral keys for each actuator, sectors operated by said actuators respectively, an accumulator having ordinal gears engageable with various of said sectors, said accumulator being pivotally mounted and movable with its gears towards and from said sectors for the engagement and disengagement of the gears, means acting to lock the numerating elements of the accumulator when it is moved away from said sectors, adjustable means releasable by the depression of a numeral key for holding an actuator from operation, and driving means having yielding connection with each actuator.

36. In a calculating machine the combination of a series of column-actuators arranged in orders, a series of numeral keys for each actuator, sectors operated by said actuators respectively, an accumulator having ordinal gears engageable with various of said sectors, said accumulator being pivotally mounted and movable with its gears towards and from said sectors for the engagement and disengagement of the gears, adjustable means releasable by the depression of a numeral key for holding an actuator from operation, and driving means having yielding connection with each actuator.

37. In a calculating machine the combination of a series of column-actuators arranged in orders, a series of numeral keys for driving and for setting each actuator, sectors operated by said actuators respectively, an accumulator having ordinal gears engageable with various of said sectors, said accumulator being pivotally mounted and movable with its gears towards and from said sectors for the engagement and disengagement of the gears, adjustable means releasable by the depression of a numeral key for holding an actuator from operation, and universal driving means having yielding connection with each actuator.

38. In a calculator optionally operable by key-drive and by key-set power-drive, in combination: an ordinal series of keys having a long key-driving movement and a short key-setting movement; a power-driven universal actuating mechanism, a column actuator operable alternatively by the key-drive and by the universal actuating mechanism; and spring means connecting the column actuator with the universal actuating mechanism and tensioned by the key-induced movement of the column actuator to restore the latter to normal when the calculator is operating with key-drive and the universal actuating mechanism is stationary.

39. In a calculating machine, the improvement characterized by a shiftable accumulator register controlled selectively by key drive and by key-set power drive, combined with a key-drive and a key-set drive therefor and means for changing the drive from one type to another.

40. In a calculating machine the combination of parallel columns of adding mechanisms, an accumulator mechanism adjustable crosswise of said columns to receive actuations of the desired orders of the accumulator, sets of ordinal driving keys for actuating the orders of adding mechanisms respectively for key-driven operation, a primary actuator connected with said adding mechanisms, and holding means for restraining said adding mechanisms respectively from operation, said keys having means for releasing said holding means, whereby the released adding mechanisms may be driven by said primary actuator for key-set operation by said actuator.

41. In a calculating machine the combination of columns of adding mechanisms, an accumulator mechanism adjustable crosswise of said columns to receive actuation of the desired orders of the accumulator, columns of ordinal keys for actuating the orders of adding mechanisms for key-driven operation, means for holding inoperative respectively said orders of adding mechanisms, means whereby each depressed key releases said holding means of its column to permit operation of its column of adding mechanism, a primary actuator having yielding connections with said columns of adding mechanisms, whereby any column of which a key is depressed and the connected part of said accumulator will be actuated, for key-set operation, by said primary actuator.

42. In a calculating machine, ordinal column actuators alternatively operable by ordinal key-drive or by key-set power-drive; combined with a carriage shiftable at will from order to order for operation of the desired orders of the accumulator, said carriage supporting for shifting with it said accumulator having a series of ordinal accumulator mechanisms, including means for effecting carrying of the tens, arranged to receive actuation from the column actuators either in key-driven or key-set operation in any ordinal position of the carriage.

43. In a calculating machine the combination of parallel columns of adding mechanisms, an accumulator mechanism adjustable crosswise of said columns and connectable in various positions with desired columns of adding mechanisms to receive actuations from the latter, and sets of ordinal driving keys for actuating the orders of adding mechanisms respectively to transfer calculative values to said accumulator mechanisms.

44. In a calculating machine, in combination: ordinal column actuators alternatively operable by key-drive or by key-set power-drive; a manually-controlled device for determining the character of drive of the column actuators; a power mechanism for driving the column actuators in key-set power-driven actuation; ordinal keys for driving the column actuators in key-driven actuation or for setting said actuators for power-driven actuation; and a shiftable carriage shiftable from order to order for multiple-place actuation, said carriage supporting for shifting with it ordinal accumulator mechanisms, including means for effecting carrying of the tens, arranged to receive actuation from the column actuators both in key-driven and key-set operation in any ordinal position of the carriage, and also supporting a shiftable counter for registering the power drive in each ordinal position of the carriage.

45. In a calculating machine, in combination: column actuators alternatively operable by key-drive or by key-set power-drive; a manually-controlled device for determining the character of drive of the column actuators; a power mechanism for driving the column actuators in key-set power-driven actuation; keys for driving the column actuators in key-driven actuation or for setting said actuators for power-driven actuation; and a shiftable carriage shiftable from order to order for multiple-place actuation, said carriage supporting for shifting with it a series of ordinal accumulator mechanisms, arranged to receive actuation from the column actuators both in key-driven and key-set operation in any ordinal position of the carriage.

46. In a calculating machine; ordinal keys, ordinal column actuators alternatively operable by key-set power-drive or directly responsive to key actuation by said ordinal keys; a series of ordinal accumulator mechanisms shiftable from order to order for multiple place actuation, said accumulator mechanism receiving actuation from said column actuators in both modes of actuation; and means for effecting carrying of the tens from order to order of said accumulator mechanism; and a key-set power-drive for said actuators.

47. In an alternatively key-driven and key-set calculator: ordinal columns of keys having a long stroke for key-drive operation and a short stroke for key-set operation, and a selector mechanism embodying accumulator actuators and their control devices adapted to have their differential movement controlled by the short strokes of said keys in key-set operation and by the long strokes of the said keys in key-driven operation.

48. In a calculator, in combination: a column actuator; a sector yieldingly connected thereto and movable thereby for transmitting increments of calculative actuation to an accumulator; a stop bar connected to said sector and movable therewith; and a columnar series of keys cooperating with said stop bar to limit the calculative movement of the sector.

49. In a calculator, in combination: a column actuator for transmitting increments of calculative actuation to an accumulator, a columnar series of keys cooperating with said actuator for actuating the same; digital stop means yieldably connected with said actuator for limiting the calculative movement of the actuator in accordance with respective keys.

50. In a calculating machine, in combination: registering devices; actuator sectors therefor; stop devices for digitally regulating the actuation of said actuator sectors; keys for operating the said actuator sectors; and a flexible connection connected to the digital stop devices of the actuator sectors and to the said actuator sectors and adapted to be set in action just before said actuators are stopped by said stop devices, to cushion the stopping action of the actuator sectors.

51. In a calculating machine, in combination: accumulator mechanism; column actuators for said accumulator mechanism; columns of keys for actuating said column actuators; and differential stop bars connected with said actuators to make contact with whichever key is depressed with respect to the said actuators, for regulating the varying digital movements of said actuators; the said connection of said stop bars with the actuators being of a flexible nature and adapted to cushion the sudden shocks, as the stop bars make contact with predetermined depressed keys.

52. In a calculating machine, in combination: ordinal column actuators; ordinal columns of depressible keys therefor; ordinal differential stop-bars adapted for limiting the degree of digital movement of the actuators according to the keys depressed by arrestment of the stop-bars by depressed keys in the respective orders; each of said actuators being connected with their respective stop-bars for limited movement relative thereto; and springs connecting the ordinal actuators with their respective stop-bars, said springs being adapted to move the stop-bars with their respective actuators upon movement thereof and to hold the actuators from movement relative to the stop-bars until after the stop-bars are arrested by depressed keys in their respective orders and to cushion the stopping of the actuators by the stop-bars during subsequent limited movement of the actuators relative to their stop-bars.

53. In a calculating machine, in combination: ordinal column actuators; ordinal actuator sectors positively connected thereto; ordinal columns of depressible keys for said actuators; ordinal differential stop-bars adapted for limiting the degree of digital movement of the actuators and their sectors according to the keys depressed by the arrestment of the stop-bars by depressed keys in their respective orders; each of said ordinal sectors being connected with their respective ordinal stop-bars for limited movement relative thereto; and springs connecting the ordinal sectors with their respective ordinal stop-bars, said springs being adapted to move the stop-bars with the sectors upon movement of the actuators and to hold the sectors from movement relative to the stop-bars until after the stop-bars are arrested by depressed keys in their respective orders and for limited movement of the sectors relative to the stop-bars while said stop-bars are being arrested by said depressed keys.

54. A calculating machine having registering means and actuating mechanism for each of said registering means including a member adapted to be moved and suddenly stopped connected with a member movable with and having a limited movement relative to said first-mentioned member, the movement of said second-mentioned member being cushioned relative to the first-mentioned member when said first-mentioned member is suddenly stopped.

In testimony whereof, I have hereunto set my hand.

JOSEPH A. V. TURCK.